No. 858,122. PATENTED JUNE 25, 1907.
L. TUCKER & J. A. SHUNK.
AIR BRAKE SYSTEM.
APPLICATION FILED OCT. 19, 1906.

Witnesses
L. H. Schmidt.

Inventors
Leroy Tucker
John A. Shunk
By Dudley Browne Phelps,
Attorneys

UNITED STATES PATENT OFFICE.

LEROY TUCKER AND JOHN ALLEN SHUNK, OF PERU, INDIANA; SAID TUCKER ASSIGNOR TO THOMAS W. ANNABAL, OF PERU, INDIANA.

AIR-BRAKE SYSTEM.

No. 858,122.      Specification of Letters Patent.      Patented June 25, 1907.

Application filed October 19, 1906. Serial No. 339,718.

*To all whom it may concern:*

Be it known that we, LEROY TUCKER and JOHN ALLEN SHUNK, citizens of the United States, residing at Peru, in the county of Miami and State of Indiana, have invented certain new and useful Improvements in Air-Brake Systems; and we do hereby declare the following to be a full, clear, and exact description of the invention, such as will enable others skilled in the art to which it appertains to make and use the same.

Our invention relates to certain new and useful improvements in air brake systems and its object consists in providing the triple valves of an air brake system with a means whereby the emergency action of each brake can be independently prevented.

As is well known, it frequently happens that in the operation of air brake systems that the triple valve on one or more of the cars will move to the emergency position when only a service application of the brake is made by the engineer. The effect of having the emergency brake applied to one or more cars of a train tends to break the train apart, to slide the wheels and produce other bad effects. Heretofore, when it was discovered that the triple valve on a car was operating to apply the emergency on a service reduction of pressure by the engineer, it has been necessary to cut out the air brake of the car having defective triple valves or else cut the car out of the train.

The object of our invention is to provide means which, when it is found that a triple valve applies the emergency on a service reduction, can be set so as to entirely prevent the valve controlling the emergency from being operated, and consequently prevent the emergency being thrown in, and yet permit of the ordinary service application of the brakes. As a result of this the ordinary brake power on the train is not in the least reduced for the ordinary service applications and only slightly reduced should the emergency be needed.

With these objects in view our invention consists in providing the triple valve with means by which the operation of the valve controlling the emergency application can be prevented from moving to the position in which the emergency application is obtained.

Our invention is applicable to any of the well known forms of triple valves and we contemplate the use of our invention with all forms of brake systems wherein the triple valve or its equivalent is used.

Figure 1:
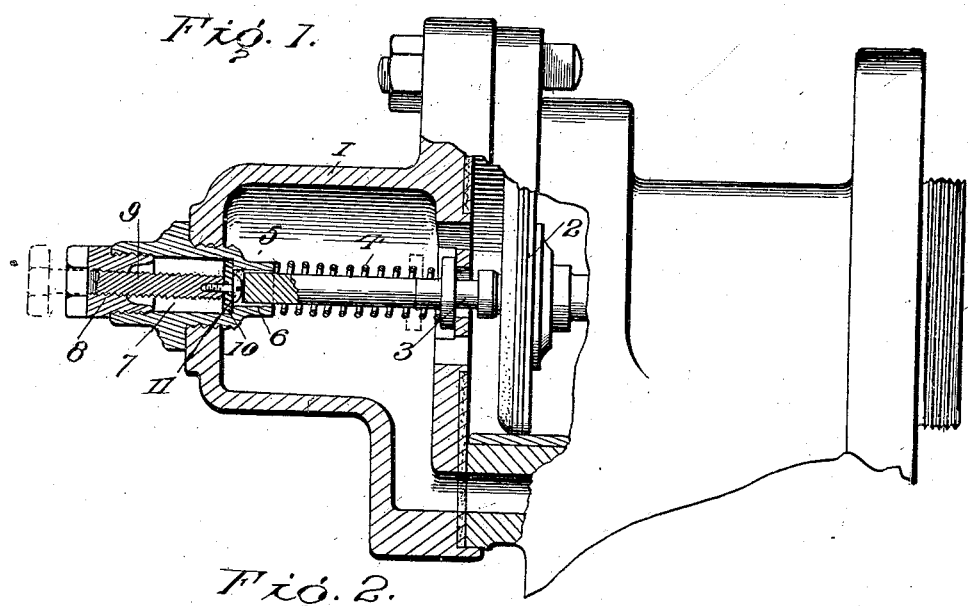
Figure 2:
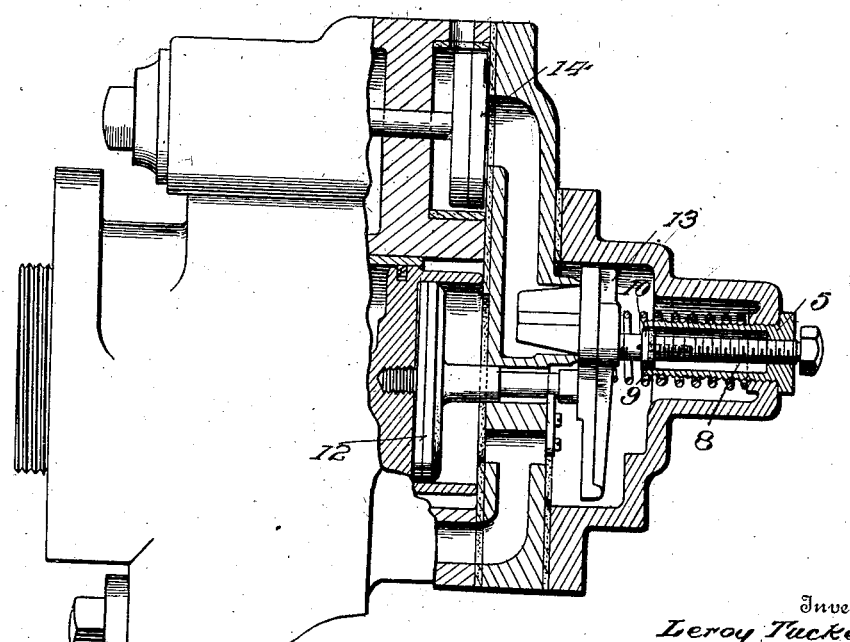

Referring to the drawings wherein the same part is designated by the same reference numeral wherever it occurs, Figure 1 is a fragmentary side elevation partly broken away of a Westinghouse triple valve showing our invention as applied thereto. Fig. 2 is a fragmentary view partly broken away of a New York Air Brake Company's triple valve showing our invention applied thereto.

In the fragmentary view of the Westinghouse triple valve shown in Fig. 1, 1 is the casing, 2 is the main piston, 3 the graduating stem, 4 the graduating spring. These parts are all of the ordinary Westinghouse type.

In applying our invention to the Westinghouse construction, we take the graduating stem nut 5 which has a bore 6 extending from its inner end sufficiently far into the nut to guide the graduating stem and permit of its movement and bore in from the other end of the stem so as to form a bore 7 which preferably is larger than the bore 6. This bore preferably extends sufficiently in so that when the graduating stem is in normal position, its inner end will be substantially flush with the inner end of the bore 6. The outer end of the bore 7 is screw threaded and into this we preferably screw a bushing 8 through which passes a bolt 9, said bolt being screw threaded into a tapped opening, which is also screw threaded, in the bushing 8. Preferably and as shown, this bolt is provided at its end with a gasket 10 held in position by a bolt 11 which passes through the gasket and engages a tapped hole, which is threaded, in the end of the bolt 9. This gasket operates to prevent any air from leaking by the threads of bolt 9. The bolt 9 is of such a length as to permit of its being screwed into a position where the head of the bolt 11 will rest against the end of the graduating stem when the stem is in its normal position. This position of the parts being shown in full lines in Fig. 1.

It will be remembered that the emergency action of the brake is caused by the piston 2 traveling a greater distance than usual and forcing the graduating stem 3 back against the tension of the spring 4. It will be evident therefore, that, when the bolt 9 is screwed in as shown in full lines in Fig. 1, the graduating stem can not move from its normal position and consequently, the piston 2 will be prevented from making its additional travel which is necessary in order to obtain an emergency application. When the bolt 9 is in the position shown in dotted lines in Fig. 1, it has no effect whatever upon the operation of the triple valve and either a service or an emergency application can be made. It will be seen that our device, in the form shown in the figures, can be applied to a Westinghouse triple valve without modifying the valve or changing its structure in the least. All that is necessary to be done is to unscrew the graduating stem nut 5 which is used in the Westinghouse construction, drill bore 7 and screw thread the outer end thereof and insert therein our construction.

In Fig. 2, we show our invention as applied to the form of triple valve manufactured by the New York Air Brake Company. In this construction, it will be seen that the triple valve case is tapped in line with the valve 13 which valve, upon the increased movement of the piston 12, due to the emergency reduction of the engineers valve admits pressure behind the piston 14 which opens the emergency valve proper. The form of construction we use in connection with this brake is practically the same as that used in connection with the Westinghouse except that the bushing 8 is preferably made longer and the bolt 9 is also longer because of the greater distance between the case and the back of the valve 13. The operation of our device in connection with this form of triple valve is however, identical with that above described in connection with the Westinghouse valve.

While we have described what we believe to be the preferred form of our invention, we desire to have it understood that many changes may be made in the form, construction, arrangement and location of parts without departing from the spirit of our invention.

Having thus described our invention, what we claim as new and desire to secure by Letters Patent is:—

1. In an automatic brake system operated by a triple valve having a valve adapted to be opened to produce the emergency pressure in the brake cylinder, of means adapted to be set to prevent the opening of the emergency valve, whereby the production of the emergency pressure in the brake cylinder is prevented.

2. In an automatic brake system operated by a triple valve having a valve adapted to be opened to produce the emergency pressure in the brake cylinder, of a moving part adapted to control the opening and closing of the emergency valve and means adapted to be moved into position to prevent the said moving part from so moving as to cause the emergency valve to open.

3. In an automatic brake system operated by a triple valve, having a valve adapted to be opened to produce the emergency pressure in the brake cylinder, of a bolt adapted to be so set as to prevent the parts of the triple valve moving to the position necessary to cause the application of the emergency pressure.

4. In an automatic brake system of the Westinghouse type, of means on the triple valve adapted to be moved in to position to prevent the movement of the graduating stem and thus prevent the valve from applying the emergency.

5. In an automatic brake system of the Westinghouse type, of a bolt tapped through the casing of the triple valve to hold the graduating stem in its normal position and thus preventing the application of the emergency.

In testimony whereof we affix our signatures, in presence of two witnesses.

LEROY TUCKER.
JOHN ALLEN SHUNK.

Witnesses:
Asa C. Haynes,
Albert Ward.